United States Patent
Gu et al.

(10) Patent No.: US 11,390,565 B2
(45) Date of Patent: Jul. 19, 2022

(54) METHOD FOR PREPARING MULTICHANNEL CERAMIC HOLLOW FIBER MEMBRANE

(71) Applicant: NANJING UNIVERSITY OF TECHNOLOGY, Nanjing (CN)

(72) Inventors: Xuehong Gu, Nanjing (CN); Zhenzhou Shi, Nanjing (CN); Yuanyuan Chen, Nanjing (CN); Chun Zhang, Nanjing (CN); Nanping Xu, Nanjing (CN)

(73) Assignee: NANJING UNIVERSITY OF TECHNOLOGY, Nanjing (CN)

( * ) Notice: Subject to any disclaimer, the term of this patent is extended or adjusted under 35 U.S.C. 154(b) by 354 days.

(21) Appl. No.: 14/898,471

(22) PCT Filed: May 9, 2014

(86) PCT No.: PCT/CN2014/077152
§ 371 (c)(1),
(2) Date: Dec. 14, 2015

(87) PCT Pub. No.: WO2014/201920
PCT Pub. Date: Dec. 24, 2014

(65) Prior Publication Data
US 2016/0137557 A1 May 19, 2016

(30) Foreign Application Priority Data
Jun. 19, 2013 (CN) .......................... 201310244094.2

(51) Int. Cl.
*C04B 35/622* (2006.01)
*B01D 67/00* (2006.01)
(Continued)

(52) U.S. Cl.
CPC ...... *C04B 35/6225* (2013.01); *B01D 67/0041* (2013.01); *B01D 69/081* (2013.01);
(Continued)

(58) Field of Classification Search
None
See application file for complete search history.

(56) References Cited

U.S. PATENT DOCUMENTS 6,341,701 B1   1/2002  Takahashi et al.
6,472,016 B1 * 10/2002  Soria et al. ................. 427/245

FOREIGN PATENT DOCUMENTS

CN           1360966 A       7/2002
CN         101905121 A  *  12/2010
(Continued)

OTHER PUBLICATIONS

Machine translation of Huang et al. (CN Patent # 102861516), pp. 1-4. (Year: 2013).*
(Continued)

*Primary Examiner* — Clare M Perrin
(74) *Attorney, Agent, or Firm* — PROI Intellectual Property US

(57) ABSTRACT

The Invention relates to a method for preparing a multichannel hollow fiber membrane. According to a certain ratio, ceramic powder, a macromolecular polymer, an organic solvent, and a dispersant are mixed evenly to prepare a membrane casting solution; and after bubble removing processing is performed on the membrane casting solution, a membrane green body is formed with the cooperation of a multichannel hollow fiber die and phase inversion. After the membrane green body is roasted at a high temperature, a multichannel ceramic hollow fiber membrane is formed. The multichannel ceramic hollow fiber membrane has an asymmetric structure and a skeleton structure in an inner cavity and can meet the strength and flux requirements of a ceramic hollow fiber membrane.

6 Claims, 3 Drawing Sheets

(51) Int. Cl.
  *B01D 69/08*   (2006.01)
  *B01D 71/02*   (2006.01)
(52) U.S. Cl.
  CPC ......... *B01D 69/082* (2013.01); *B01D 71/024* (2013.01); *B01D 71/025* (2013.01); *B01D 2325/04* (2013.01); *B01D 2325/24* (2013.01); *C04B 2235/3246* (2013.01); *C04B 2235/6021* (2013.01)

(56) References Cited

FOREIGN PATENT DOCUMENTS

| | | | |
|---|---|---|---|
| CN | 101905121 | A | 12/2010 |
| CN | 202136924 | U | 2/2012 |
| CN | 102861516 | A * | 1/2013 |
| CN | 102861516 | A | 1/2013 |
| CN | 103111192 | A | 5/2013 |
| CN | 103349918 | A | 10/2013 |
| JP | 1280021 | A | 11/1989 |
| JP | 022846 | A | 1/1990 |
| JP | 02002846 | A * | 10/1990 |

OTHER PUBLICATIONS

Machine translation of Anzai et al. (JP Patent # 02002846), pp. 1-3. (Year: 1990).*
Machine translation of Xu et al. (CN Patent # 101905121), pp. 1-4. (Year: 2010).*

\* cited by examiner

METHOD FOR PREPARING MULTICHANNEL CERAMIC HOLLOW FIBER MEMBRANE

CROSS-REFERENCE TO RELATED APPLICATIONS

This application claims priority from CN Application No. 201310244094.2, filed Jun. 19, 2013 and PCT Application No. PCT/CN2014/077152, filed May 9, 2014, the contents of which are incorporated herein in the entirety by reference.

FIELD OF THE INVENTION

The present invention belongs to the field of inorganic membrane preparation relating to a method for preparing a multi-channel ceramic hollow fiber membrane. The Invention is aimed at improving the mechanical property of the hollow fiber and solving the problem of fragility during application.

BACKGROUND OF THE INVENTION

Ceramic membrane possesses the characteristics of excellent chemical stability, high temperature resistance and narrow pore diameter distribution, etc. and it is widely used in such fields as chemical industry, petrochemical industry, food industry and environmental engineering. Ceramic hollow fiber membrane not only possesses the features of the traditional ceramic membrane, but also has the loading density of 3000 $m^2/m^3$ (Basic Principles of Membrane Technology, wrote by MarcelMulder. and translated by Li Lin), which is 10 times of that of tubular membrane and flat membrane, significantly improving the separation efficiency. Therefore, it can be used as the catalyst support in the support body, the microfiltration process and the membrane reactor in the field of membrane separation.

The report with regard to inorganic hollow fiber membrane was first seen at the beginning of the 1990s. Lee and Smid prepared hollow fiber membrane through the methods of dry-wet spinning and melting spinning respectively with aluminum oxide as the raw material. With the deep development of the technology for preparing hollow fiber membrane, the hollow fiber membranes with different materials and microstructures are prepared. As the application scope of the hollow fiber membrane enlarges, the problems of low strength and fragility are increased day by day, showing that the strength failure risk exists in water/organic solvent system during long-term use. Therefore, the preparation of the ceramic hollow fiber membrane with high mechanical strength and high flux is the problem that needs to be solved urgently before extensive industrialized application. Li et al. (Li K et al. Desalination, 199 2006 360-362) tried to improve the strength of the hollow fiber, however, the breakage load of the prepared hollow fiber membrane was always kept at about 3N. Some specialists in the field of material science also tried to optimize the mechanical property of the ceramic and thus to improve the reliability of the ceramic during application. Some researchers improved the strength and toughness of the ceramic in three ways: improving the powder size (CN 1472448 A): the mechanical property of the ceramic is optimized by using the pinning effect of the small particles powder in the main crystal boundary; YSZ transformation toughening (CN 102850042 A): the tetragonal phase crystal is formed under ambient temperature by forming a solid solution with the stabilizers as yttrium oxide and yttrium oxide, wherein, the internal stress formed through crystal transition can consume the external stress and improve the mechanical property of the ceramic; whisker toughening: the mechanical property of the ceramic is improved through consuming the external stress by pulling-out and breakage of the crystal whisker and adding of microcrack propagation path. However, the finger-like pore and vesicular structure (which is aiming at improving the flux of the hollow fiber membrane) in the asymmetric structure of the ceramic hollow fiber membrane become the largest defects in improving the strength and toughness of the hollow fiber membrane. Therefore, these schemes are not ideal for solving the problems of fragility and low strength. Therefore, the preparation of the ceramic hollow fiber membrane with high mechanical strength becomes the problem needs to be solved urgently before extensive industrialized application.

SUMMARY OF THE INVENTION

The purposes of the Invention are to improve the deficiency of the prior art and provide a method for preparing a multichannel ceramic hollow fiber.

The technical scheme of the Invention is a method for preparing a multichannel ceramic hollow fiber, comprising the following steps:

(1) preparing membrane casting solution: mixing a ceramic powder, a macromolecular polymer, an organic solvent, and a dispersant evenly to form a uniform and stable membrane casting solution; wherein, the ceramic powder accounts for 55-65%, the macromolecular polymer 4-8%, the organic solvent 27-38% and the dispersant 0.6-1.6% of the total mass of the membrane casting solution;

(2) vacuum bubble removing: removing the bubble in the membrane casting solution under vacuum degree;

(3) forming of multichannel ceramic hollow fiber membrane: the membrane casting solution passes through the multichannel hollow fiber die driven by air pressure to form a multichannel ceramic hollow fiber membrane green body after the phase inversion in the internal and external coagulation baths through an air clearance;

(4) drying: drying the green body of multichannel ceramic hollow fiber membrane naturally at 40° C.-60° C.;

(5) high temperature sintering: placing the green body of multichannel ceramic hollow fiber membrane in the furnace and rising temperature through a program and conducting the treatments as binder removing in low temperature and melting in high temperature to obtain a multichannel ceramic hollow fiber membrane by means of sintering.

Preferably, the said ceramic powder is one or two of yttria-stabilized zirconia (YSZ), aluminum oxide or titanium oxide; the scope of the average particle diameter of the powder is 0.05-4 µm; the macromolecular polymer is one or two of polyether sulfone, polysulfone or vinylidene fluoride homopolymers; the organic solvent is one or two of N-Methylpyrrolidone, dimethylformamide, dimethylacetamide or trichloromethane; the dispersant is one or two of polyvinylpyrrolidone, ethylcellulose or polyethylene glycol.

Preferably, the external coagulation bath is one or two of water, ethanol or N-Methylpyrrolidone; the internal coagulation bath is one or two of deionized water, dimethylformamide or N-Methylpyrrolidone; the temperature of the internal and external coagulation baths are both 15-35° C.; the flow of internal coagulation bath is 40-60 mL/min.

Preferably, vacuum degree for vacuum bubble removing is 0.1-0.2 MPa and the time for bubble removing is 1-2 h. Preferably, the air clearance is 10-40 cm; the driving air pressure is 0.1-0.4 MPa.

Preferably, the temperature is risen to 500-600° C. at a heating rate of 1-2° C./min through the program in the first place, then it is risen to 1400-1600° C. at a heating rate of 3-5° C./min and preserved with the heat for 4-8 h, and then cooled to 500-600° C. at a rate of 3-5° C./min and finally cooled naturally.

A multichannel ceramic hollow fiber membrane prepared through the method of the Invention, characterized in that the outer diameter of the multichannel ceramic hollow fiber membrane is 2-4 mm, the channel diameter 0.6-1.2 mm, the breakage load 19-25N, the pure water flux 1.43-2.4 $L \cdot Pa^{-1} \cdot m^{-2}$ $min^{-1}$, the porosity factor 53-65% and the average pore diameter 1.2-2.9 μm. Preferably, the amount of the channel is 4-9.

The Invention is to mix a ceramic powder, a macromolecular polymer, an organic solvent, and a dispersant evenly to form a uniform and stable membrane casting solution. Bubbles of the membrane casting solution are removed in vacuum. Under the control of peristaltic pump, the flow rate of the internal coagulation bath is 40-60 mL/min and the temperature is 15-35° C.; squeezing the membrane casting solution into spinning nozzle under the driving air pressure of 0.1-0.4 and the effect of gear pump; the preliminary formed green body falls into the external coagulation bath vertically through an air clearance of 10-40 cm at 15-35° C. for solidification and formation with the cooperation of a multichannel hollow fiber membrane die and phase inversion. The temperature for drying the green body of the multichannel ceramic hollow fiber membrane naturally is 40-60° C., having an important influence on the quality of the green body. Excessive low temperature means long time drying and low efficiency, while excessive high temperature means solidification reaction is too rapid, making the pore content of the green body increased or even making the green body cracked. Upon high temperature sintering for the dried green body at 1400-1600° C. for 4-8 h, a multichannel ceramic hollow fiber is prepared. The prepared multichannel ceramic hollow fiber membrane props up a skeleton structure in an inner cavity to achieve the effect of enhancing the strength of ceramic hollow fiber membrane.

Beneficial Effects

The innovation point of the Invention lies in optimizing the integral structure of the ceramic hollow fiber membrane by propping up a skeleton structure in the inner cavity of the ceramic hollow fiber membrane to achieve the effect of enhancing the strength of ceramic hollow fiber membrane. The technology for preparing the multichannel ceramic hollow fiber membrane is now mastered maturely. The multichannel ceramic hollow fiber membrane shows the following advantages during application: (1) high mechanical strength. The breakage load of the multichannel ceramic hollow fiber membrane is 19-22 N, which is 5-7 times of that of the ordinary ceramic hollow fiber membrane. The skeleton structure in the inner cavity of the multichannel ceramic hollow fiber membrane and the surrounding supporting trigonum become the main structure for enhancing the strength of the ceramic hollow fiber membrane; (2) high flux and high selectivity. The multichannel ceramic hollow fiber membrane possesses a typical asymmetric structure (fingerlike pore improves the flux and the sponge structure improves the selectivity); (3) reducing wall thickness and reducing the trans-membrane resistance for feed liquid. The wall thickness of the multichannel ceramic hollow fiber membrane is 0.1-0.3 mm and the one of ordinary ceramic hollow fiber membrane is 0.4-0.5 mm. As the wall thickness reduces, the mechanical strength of the multichannel ceramic hollow fiber membrane is improved synchronously, reconciling the mutual-restricted strength and flux. Upon technical research and design and scaling-up of industry production equipments for the project, the annual production capacity now reaches 20000; the length of the multichannel ceramic hollow fiber membrane is 70 cm, the breakage load 19-22 N and the porosity factor 50~60%.

DETAILED DESCRIPTION OF PARTICULAR EMBODIMENTS OF THE INVENTION

The detailed embodiments and drawings are given to illustrate the preparation technology of the multichannel ceramic hollow fiber membrane.

Embodiment 1 Preparation of YSZ Seven-Channel Hollow Fiber Membrane

Figure 1:
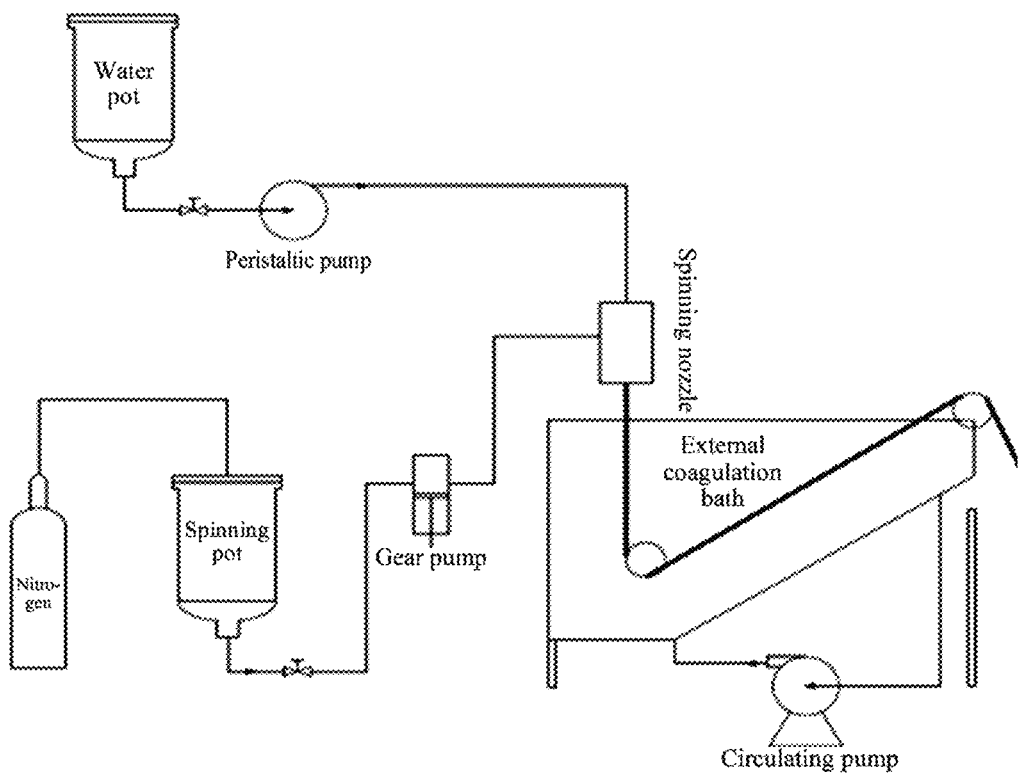
FIG. 1 Flow chart of dry/wet spinning.
Figure 2:
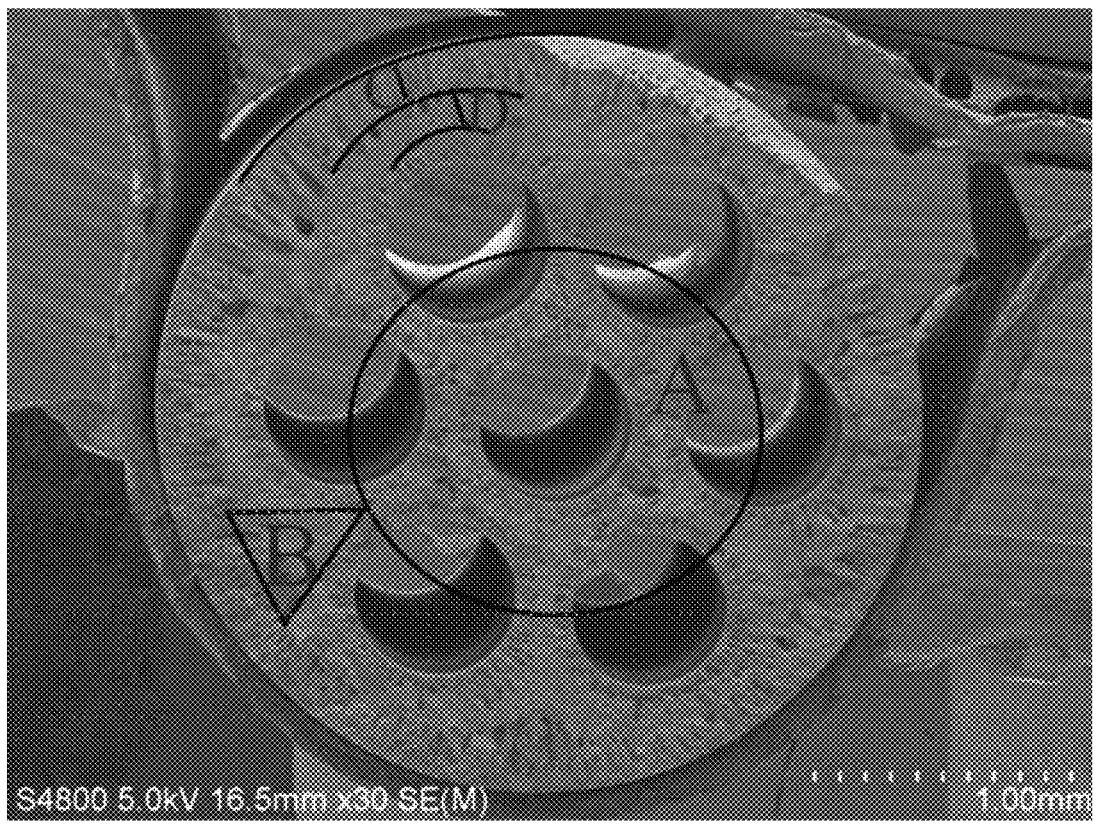
FIG. 2 SEM image of YSZ seven-channel ceramic hollow fiber membrane (Zone A—skeleton structure; Zone B—supporting trigonum; Zone C—area of finger-like pore; Zone D—area of sponge structure)

The N-Methylpyrrolidone, polyvinylpyrrolidone, polyether sulfone and YSZ are mixed evenly in a certain order according to a mass proportion of 0.3:0.01:0.04:0.65. The evenly mixed membrane casting solution is transferred into a spinning pot for removing the bubbles under the vacuum degree of 0.1 MPa for 2 h. Tap water is selected as the external coagulation bath with the temperature of 15° C., while deionized water as the internal coagulation bath with the temperature of 15° C.; the flow of the internal coagulation bath is 40 mL/min and air clearance 10 cm; driven by the pressure of 0.14 MPa, the membrane casting solution is squeezed out of the spinning nozzle for preliminary formation under the effect of internal coagulation bath and seven-channel spinning nozzle; through full phase inversion in the external coagulation bath, a green body of the YSZ seven-channel ceramic hollow fiber membrane with a certain microstructure is formed. The entire spinning process is shown in FIG. 1. The green body is placed in the furnace for sintering. The temperature is risen to 500° C. at a heating rate of 1° C./min in the first place, then it is risen to 1400° C. at a heating rate of 3° C./min and preserved with the heat for 5 h, and then cooled to 500° C. at a rate of 3° C./min and finally cooled naturally. The outer diameter of the prepared seven-channel ceramic hollow fiber membrane is 2.92 mm and the channel diameter 0.61 mm as shown in FIG. 2. The property of the YSZ seven-channel ceramic hollow fiber membrane is measured through four methods as pure water flux method, three-point bending strength method, Archimedes drainage method and gas bubble-pressure method.

The pure water flux of the YSZ seven-channel ceramic hollow fiber membrane is 1.68 L·Pa$^{-1}$·m$^{-2}$ min$^{-1}$, the breakage load 19 N, the porosity factor 65% and the average pore diameter 1.4-1.6 μm.

Embodiment 2 Preparation of Al$_2$O$_3$ Seven-Channel Hollow Fiber Membrane

Figure 3:
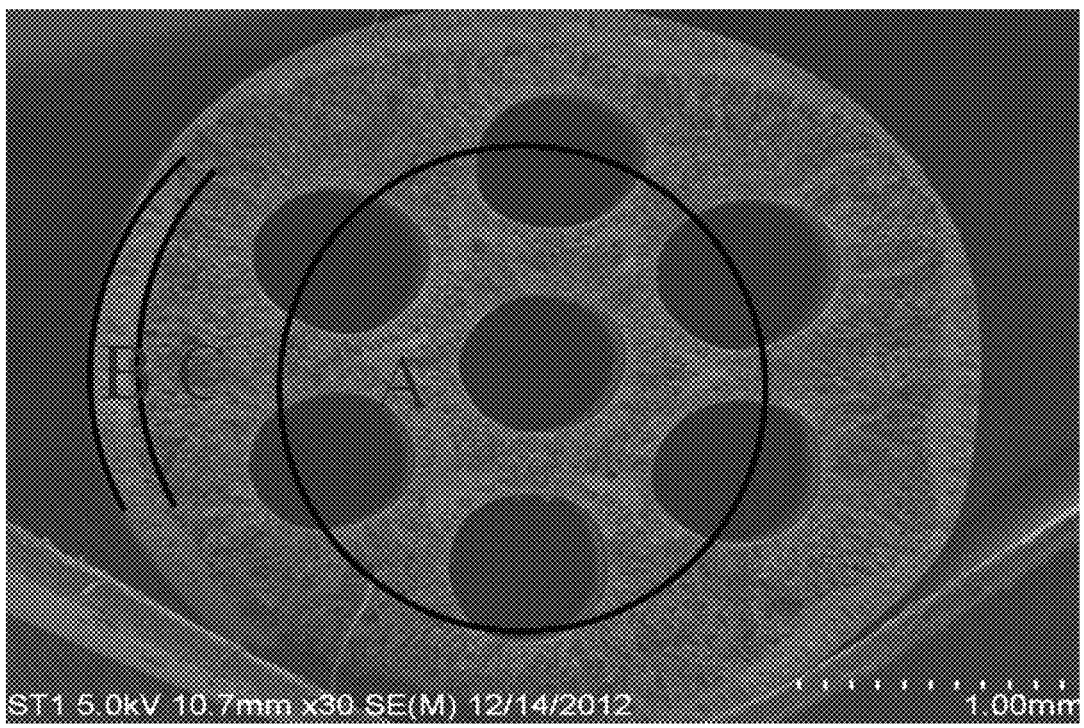
FIG. 3 SEM image of $Al_2O_3$ seven-channel ceramic hollow fiber membrane (Zone A—skeleton structure; Zone B—sponge structure; Zone C—vesicular structure)

The dimethylacetamide, polyvinylpyrrolidone, polyether sulfone and Al$_2$O$_3$ are mixed evenly in a certain order according to a mass proportion of 0.372:0.008:0.07:0.55. The evenly mixed membrane casting solution is transferred into a spinning pot for removing the bubbles under the vacuum degree of 0.2 MPa for 1 h. Ethanol is selected as the external coagulation bath with the temperature of 25° C., while dimethylacetamide as the internal coagulation bath with the temperature of 20° C.; the flow of the internal coagulation bath is controlled at 60 mL/min and air clearance 40 cm; driven by the pressure of 0.2 MPa, the membrane casting solution is squeezed out of the spinning nozzle for preliminary formation under the effect of internal coagulation bath and seven-channel spinning nozzle. Through full phase inversion in the external coagulation bath, a green body of the Al$_2$O$_3$ seven-channel ceramic hollow fiber membrane with a certain microstructure is formed. The green body is placed in the furnace for sintering. The temperature is risen to 600° C. at a heating rate of 2° C./min in the first place, then it is risen to 1600° C. at a heating rate of 5° C./min and preserved with the heat for 8 h, and then cooled to 600° C. at a rate of 5° C./min and finally cooled naturally. The outer diameter of the prepared Al$_2$O$_3$ seven-channel ceramic hollow fiber membrane is 3.37 mm and the channel diameter 0.65 mm as shown in FIG. 3. The measurement method is the same as that in Embodiment 1. The pure water flux of the Al$_2$O$_3$ seven-channel ceramic hollow fiber membrane is 1.43 L·Pa$^{-1}$·m$^{-2}$ min$^{-1}$, the breakage load 20 N, the porosity factor 56% and the average pore diameter 1.2-1.4 μm.

Embodiment 3 Preparation of YSZ Four-Channel Hollow Fiber Membrane

Figure 4:
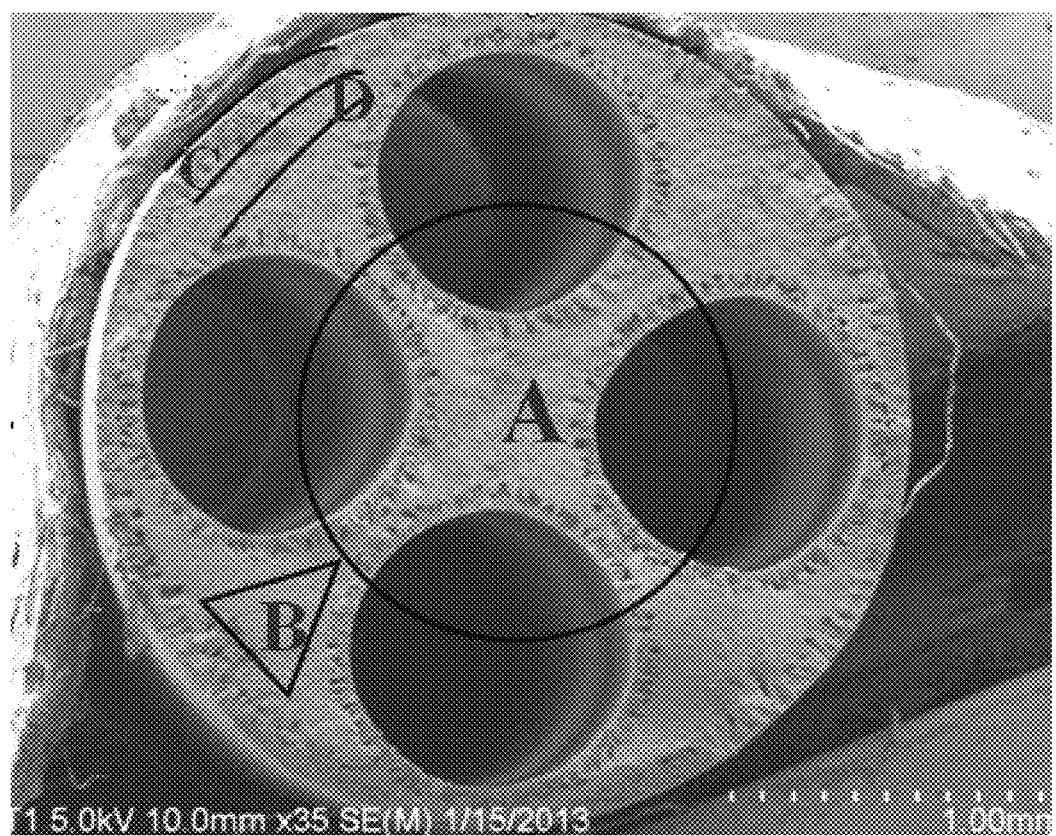
FIG. 4 SEM image of YSZ four-channel ceramic hollow fiber membrane (Zone A—skeleton structure; Zone B—supporting trigonum; Zone—area of finger-like pore; Zone D—area of sponge structure)

The trichloromethane, polyethylene glycol, polyvinylidene fluoride and YSZ are mixed evenly in a certain order according to a mass proportion of 0.305:0.01:0.045:0.64. The evenly mixed membrane casting solution is transferred into a spinning pot for removing the bubbles under the vacuum degree of 0.1 MPa for 2 h. Tap water is selected as the external coagulation bath with the temperature of 25° C., while N-Methylpyrrolidone as the internal coagulation bath with the temperature of 25° C.; the flow of the internal coagulation bath is controlled at 50 mL/min and air clearance 20 cm; driven by the pressure of 0.32 MPa, the membrane casting solution is squeezed out of the spinning nozzle for preliminary formation under the effect of internal coagulation bath and four-channel spinning nozzle; through full phase inversion in the external coagulation bath, a green body of the YSZ four-channel ceramic hollow fiber membrane with a certain microstructure is formed. The green body is placed in the furnace for sintering. The temperature is risen to 600° C. at a heating rate of 2° C./min in the first place, then it is risen to 1500° C. at a heating rate of 4° C./min and preserved with the heat for 6 h, and then cooled to 600° C. at a rate of 4° C./min and finally cooled naturally. The outer diameter of the prepared YSZ four-channel ceramic hollow fiber membrane is 2.60 mm and the channel diameter 0.86 mm as shown in FIG. 4. The measurement method is the same as that in Embodiment 1. The pure water flux of the YSZ seven-channel ceramic hollow fiber membrane is 1.8 L·Pa$^{-1}$·m$^{-2}$ min$^{-1}$, the breakage load 22 N, the porosity factor 56% and the average pore diameter 2.6-2.9 μm.

Embodiment 4 Preparation of Al$_2$O$_3$ Four-Channel Hollow Fiber Membrane

Figure 5:
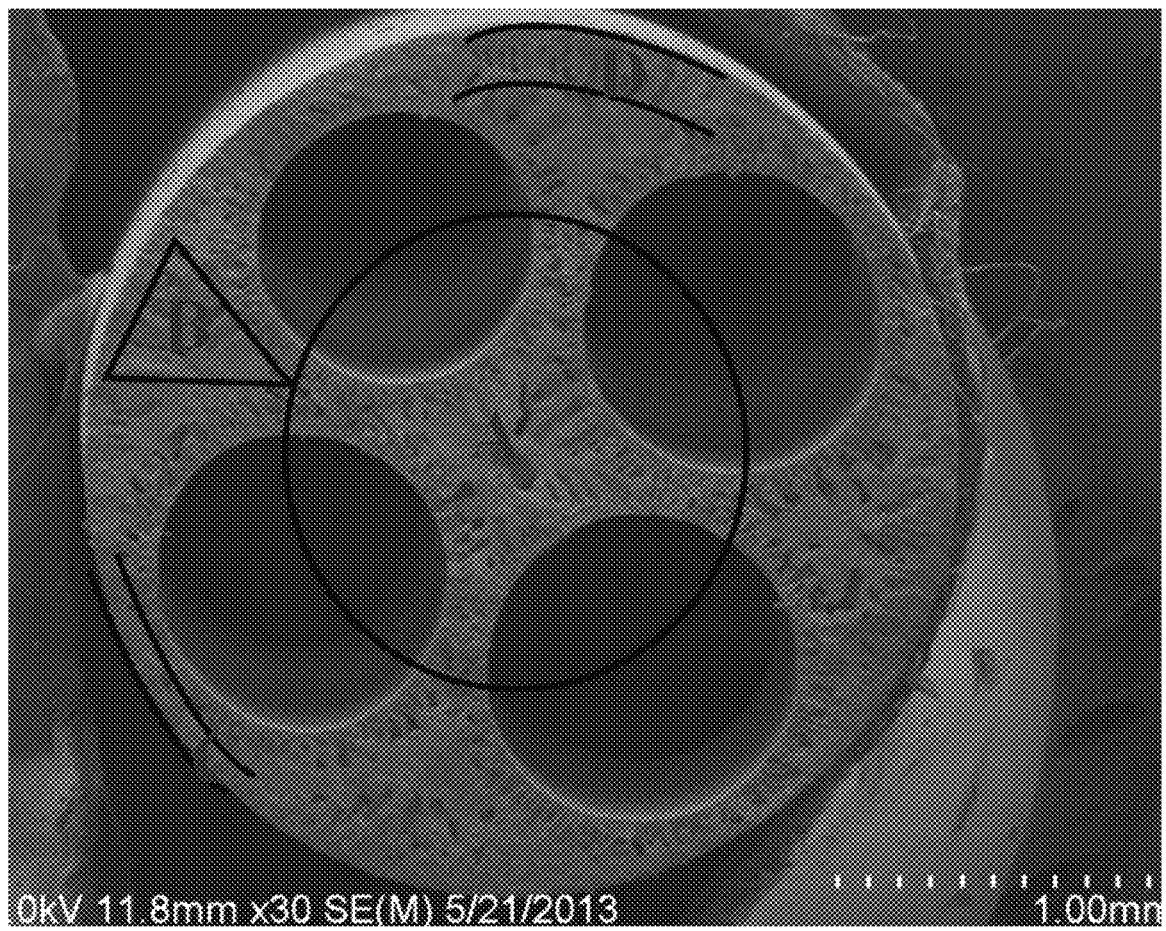
FIG. 5 SEM image of Al2O3 four-channel ceramic hollow fiber membrane (Zone A—skeleton structure; Zone B—supporting trigonum; Zone C—area of finger-like pore; Zone D—area of sponge structure).

The dimethylacetamide, polyvinylpyrrolidone, polyether sulfone and Al$_2$O$_3$ are mixed evenly in a certain order according to a mass proportion of 0.27:0.016:0.07:0.644. The evenly mixed membrane casting solution is transferred into a spinning pot for removing the bubbles under the vacuum degree of 0.2 MPa for 1 h. Ethanol is selected as the external coagulation bath with the temperature of 35° C., while dimethylacetamide as the internal coagulation bath with the temperature of 35° C.; the flow of the internal coagulation bath is controlled at 40 mL/min and air clearance 30 cm; driven by the pressure of 0.4 MPa, the membrane casting solution is squeezed out of the spinning nozzle for preliminary formation under the effect of internal coagulation bath and four-channel spinning nozzle. Through full phase inversion in the external coagulation bath, a green body of the Al$_2$O$_3$ four-channel ceramic hollow fiber membrane with a certain microstructure is formed. The green body is placed in the furnace for sintering. The temperature is risen to 600° C. at a heating rate of 2° C./min in the first place, then it is risen to 1550° C. at a heating rate of 4° C./min and preserved with the heat for 5 h, and then cooled to 500° C. at a rate of 4° C./min and finally cooled naturally. The outer diameter of the prepared Al$_2$O$_3$ four-channel ceramic hollow fiber membrane is 2.78 mm and the channel diameter 0.9 mm as shown in FIG. 5. The measurement method is the same as that in Embodiment 1. The pure water flux of the Al$_2$O$_3$ seven-channel ceramic hollow fiber membrane is 2.4 L·Pa$^{-1}$·m$^{-2}$ min$^{-1}$, the breakage load 25 N, the porosity factor 53% and the average pore diameter 1.4-1.5 μm.

What is claimed is:

1. A method for preparing a multichannel ceramic hollow fiber membrane, comprising the following steps:
   (1) preparing a uniform and stable membrane casting solution by mixing evenly a ceramic powder, a macromolecular polymer, an organic solvent, and a dispersant; wherein, the ceramic powder accounts for 55-65%, the macromolecular polymer 4-8%, the organic solvent 27-38%, and the dispersant 0.6-1.6% of the total mass of the membrane casting solution;
   (2) removing bubbles from the membrane casting solution via vacuum;
   (3) driving the membrane casting solution through a multichannel hollow fiber die via air pressure into an internal coagulation bath to form a preliminary green body, passing the preliminary green body through an air gap and then into an external coagulation bath to form a multichannel ceramic hollow fiber membrane green body, wherein a phase inversion occurs in the internal coagulation bath and the external coagulation bath;
   (4) drying the multichannel ceramic hollow fiber membrane green body at 40° C.-60° C.; and
   (5) sintering the multichannel ceramic hollow fiber membrane green body in a furnace and raising the temperature through a program to obtain a multichannel ceramic hollow fiber membrane.

2. The method according to claim 1, wherein said ceramic powder is one or two selected from the group consisting of yttria-stabilized zirconia, aluminum oxide and titanium oxide, with an average particle diameter between 0.05 µm and 4 µm; said macromolecular polymer is one or two selected from the group consisting of polyether sulfone, polysulfone and vinylidene fluoride homopolymers; said organic solvent is one or two selected from the group consisting of N-methylpyrrolidone, dimethylformamide, dimethylacetamide and trichloromethane; and said dispersant is one or two selected from the group consisting of polyvinylpyrrolidone, ethylcellulose and polyethylene glycol.

3. The method according to claim 1, wherein said external coagulation bath is one or two selected from water, ethanol and N-methylpyrrolidone; said internal coagulation bath is one or two selected from deionized water, dimethylformamide and N-methylpyrrolidone; said internal and external coagulation baths both have a temperature of 15-35° C.; and said internal coagulation bath flows at a rate at 40-60 mL/min.

4. The method according to claim 1, wherein the vacuum for removing the bubbles is 0.1-0.2 MPa and the time for removing the bubbles is 1-2 h.

5. The method according to claim 1, wherein the air gap is 10-40 cm; and the driving air pressure is 0.1-0.4 MPa.

6. The method according to claim 1, wherein the program raises the temperature to 500-600° C. at a rate of 1-20° C./min and then to 1400-1600° C. at a rate of 3-5° C./min, maintains that temperature for 4-8 h, then cools the temperature to 500-600° C. at a rate of 3-5° C./min and finally to room temperature.

* * * * *